United States Patent
Clarke et al.

(10) Patent No.: US 12,164,451 B2
(45) Date of Patent: Dec. 10, 2024

(54) DATA PROCESSING ARRAY INTERFACE HAVING INTERFACE TILES WITH MULTIPLE DIRECT MEMORY ACCESS CIRCUITS

(71) Applicant: Xilinx, Inc., San Jose, CA (US)

(72) Inventors: David Patrick Clarke, Walkinstown (IE); Peter McColgan, North Dublin (IE); Juan J. Noguera Serra, San Jose, CA (US); Tim Tuan, San Jose, CA (US); Saurabh Mathur, Saratoga, CA (US); Amarnath Kasibhatla, Sunnyvale, CA (US); Javier Cabezas Rodriguez, Austin, TX (US); Pedro Miguel Parola Duarte, Dublin (IE); Zachary Blaise Dickman, Dublin (IE)

(73) Assignee: Xilinx, Inc., San Jose, CA (US)

(*) Notice: Subject to any disclaimer, the term of this patent is extended or adjusted under 35 U.S.C. 154(b) by 0 days.

(21) Appl. No.: 17/663,824

(22) Filed: May 17, 2022

(65) Prior Publication Data

US 2023/0376437 A1    Nov. 23, 2023

(51) Int. Cl.
*G06F 13/28* (2006.01)
*G06F 15/80* (2006.01)

(52) U.S. Cl.
CPC .......... *G06F 13/28* (2013.01); *G06F 2213/28* (2013.01)

(58) Field of Classification Search
CPC .............................. G06F 13/28; G06F 12/0246
See application file for complete search history.

(56) References Cited

U.S. PATENT DOCUMENTS

| | | | |
|---|---|---|---|
| 3,776,137 A | 12/1973 | Abbott | |
| 4,876,641 A | 10/1989 | Cowley | |
| 6,091,263 A | 7/2000 | New et al. | |
| 6,150,839 A | 11/2000 | New et al. | |
| 2,204,687 A1 | 3/2001 | Schultz et al. | |
| 6,204,687 B1 | 3/2001 | Schultz et al. | |
| 6,462,579 B1 | 10/2002 | Camilleri et al. | |
| 6,526,557 B1 | 2/2003 | Young et al. | |
| 6,759,869 B1 | 7/2004 | Young et al. | |
| 6,781,407 B2 | 8/2004 | Schultz | |

(Continued)

FOREIGN PATENT DOCUMENTS

| | | |
|---|---|---|
| WO | 2019195132 | 10/2019 |
| WO | 2019195309 | 10/2019 |
| WO | 2019195343 | 10/2019 |

OTHER PUBLICATIONS

Xilinx, Inc., "Xilinx AI Engines and Their Applications," WP506 (v1.1) Jul. 10, 2020, 13 pages.

(Continued)

*Primary Examiner* — Getente A Yimer
(74) *Attorney, Agent, or Firm* — Kevin T. Cuenot

(57) ABSTRACT

An integrated circuit (IC) can include a data processing array including a plurality of compute tiles arranged in a grid. The IC can include an array interface coupled to the data processing array. The array interface includes a plurality of interface tiles. Each interface tile includes a plurality of direct memory access circuits. The IC can include a network-on-chip (NoC) coupled to the array interface. Each direct memory access circuit is communicatively linked to the NoC via an independent communication channel.

20 Claims, 8 Drawing Sheets

(56) References Cited

U.S. PATENT DOCUMENTS

| | | |
|---|---|---|
| 6,810,514 B1 | 10/2004 | Alfke et al. |
| 6,836,842 B1 | 12/2004 | Guccione et al. |
| 6,907,595 B2 | 6/2005 | Curd et al. |
| 7,024,651 B1 | 4/2006 | Camilleri et al. |
| 7,057,413 B1 | 6/2006 | Young et al. |
| 7,124,338 B1 | 10/2006 | Mark et al. |
| 7,185,309 B1 | 2/2007 | Kulkarni et al. |
| 7,199,608 B1 | 4/2007 | Trimberger |
| 7,224,184 B1 | 5/2007 | Levi et al. |
| 7,281,093 B1 | 10/2007 | Kulkarni et al. |
| 7,301,822 B1 | 11/2007 | Walstrum, Jr. et al. |
| 7,302,625 B1 | 11/2007 | Payakapan et al. |
| 7,454,658 B1 | 1/2008 | Baxter |
| 7,328,335 B1 | 2/2008 | Sundararajan et al. |
| 7,380,035 B1 | 5/2008 | Donlin |
| 7,394,288 B1 | 7/2008 | Agarwal |
| 7,420,392 B2 | 9/2008 | Schultz et al. |
| 7,477,072 B1 | 1/2009 | Kao et al. |
| 7,478,357 B1 | 1/2009 | Mason et al. |
| 7,482,836 B2 | 1/2009 | Levi et al. |
| 7,500,060 B1 | 3/2009 | Anderson et al. |
| 7,509,617 B1 | 3/2009 | Young |
| 7,518,396 B1 | 4/2009 | Kondapalli et al. |
| 7,521,961 B1 | 4/2009 | Anderson |
| 7,539,845 B1 | 5/2009 | Wentzlaff et al. |
| 7,546,572 B1 | 6/2009 | Ballagh et al. |
| 7,574,680 B1 | 8/2009 | Kulkarni et al. |
| 7,576,561 B1 | 8/2009 | Huang |
| 7,619,442 B1 | 11/2009 | Mason et al. |
| 7,640,527 B1 | 12/2009 | Dorairaj et al. |
| 7,650,248 B1 | 1/2010 | Baxter |
| 7,653,820 B1 | 1/2010 | Trimberger |
| 7,689,726 B1 | 3/2010 | Sundararajan et al. |
| 7,724,815 B1 | 5/2010 | Raha et al. |
| 7,746,099 B1 | 6/2010 | Chan et al. |
| 7,774,579 B1 | 8/2010 | Wentzlaff |
| 7,788,625 B1 | 8/2010 | Donlin et al. |
| 7,831,801 B1 | 11/2010 | Anderson |
| 8,006,021 B1 | 8/2011 | Li et al. |
| 8,020,163 B2 | 9/2011 | Nollet et al. |
| 8,045,546 B1 | 10/2011 | Bao et al. |
| 8,102,188 B1 | 1/2012 | Chan et al. |
| 8,214,694 B1 | 7/2012 | McKechnie et al. |
| 8,250,342 B1 | 8/2012 | Kostamov et al. |
| 8,359,448 B1 | 1/2013 | Neuendorffer |
| 8,415,974 B1 | 4/2013 | Lysaght |
| 8,656,141 B1 | 2/2014 | Agarwal |
| 8,719,750 B1 | 5/2014 | Balzli, Jr. |
| 8,796,539 B2 | 8/2014 | Asaumi et al. |
| 8,928,351 B1 | 1/2015 | Konduru |
| 9,081,634 B1 | 7/2015 | Simkins et al. |
| 9,152,794 B1 | 10/2015 | Sanders et al. |
| 9,165,143 B1 | 10/2015 | Sanders et al. |
| 9,218,443 B1 | 12/2015 | Styles et al. |
| 9,230,112 B1 | 1/2016 | Peterson et al. |
| 9,323,876 B1 | 4/2016 | Lysaght et al. |
| 9,336,010 B2 | 5/2016 | Kochar et al. |
| 9,411,688 B1 | 8/2016 | Poolla et al. |
| 9,436,785 B1 | 9/2016 | Javre |
| 9,639,487 B1 | 5/2017 | Wentzlaff |
| 9,652,252 B1 | 5/2017 | Kochar et al. |
| 9,652,410 B1 | 5/2017 | Schelle et al. |
| 9,722,613 B1 | 8/2017 | Schultz et al. |
| 9,990,241 B2 | 6/2018 | Dobbs |
| 10,243,882 B1 | 3/2019 | Swarbrick |
| 10,505,548 B1 | 12/2019 | Swarbrick |
| 10,673,439 B1 | 6/2020 | Ahmad |
| 10,673,745 B2 | 6/2020 | Swarbrick |
| 10,686,447 B1 | 6/2020 | Wang et al. |
| 10,747,690 B2 | 8/2020 | Bilski |
| 10,824,505 B1 | 11/2020 | Swarbrick |
| 10,824,584 B1 | 11/2020 | Noguera Serra |
| 10,838,908 B2 | 11/2020 | Swarbrick |
| 10,866,753 B2 | 12/2020 | Noguera Serra et al. |
| 10,963,421 B1 | 3/2021 | Swarbrick |
| 11,323,391 B1 | 5/2022 | McColgan et al. |
| 11,669,464 B1 * | 6/2023 | Bilski ............... G06F 12/0607 |
| | | 711/154 |
| 2004/0114609 A1 | 6/2004 | Swarbrick et al. |
| 2004/0210695 A1 | 10/2004 | Weber et al. |
| 2007/0006137 A1 | 1/2007 | Savagaonkar |
| 2007/0124565 A1 | 5/2007 | Jones |
| 2008/0082759 A1 | 4/2008 | Pong |
| 2008/0320255 A1 | 12/2008 | Wingard et al. |
| 2008/0320268 A1 | 12/2008 | Wingard et al. |
| 2012/0036296 A1 | 2/2012 | Wingard et al. |
| 2012/0310983 A1 | 12/2012 | Mittal |
| 2014/0006751 A1 | 1/2014 | Aliseychik et al. |
| 2014/0267334 A1 | 9/2014 | Duluk, Jr. |
| 2014/0344485 A1 * | 11/2014 | Dondini ............... G06F 13/28 |
| | | 710/22 |
| 2016/0011996 A1 | 1/2016 | Asaad et al. |
| 2017/0140800 A1 | 5/2017 | Wingard et al. |
| 2017/0220499 A1 | 8/2017 | Gray |
| 2017/0315944 A1 | 11/2017 | Mayer et al. |
| 2018/0012637 A1 | 1/2018 | Krishna |
| 2019/0155666 A1 | 5/2019 | Dobbs |
| 2019/0205263 A1 | 7/2019 | Fleming |
| 2019/0205269 A1 | 7/2019 | Fleming, Jr. |
| 2019/0238453 A1 | 8/2019 | Swarbrick et al. |
| 2019/0266125 A1 | 8/2019 | Swarbrick et al. |
| 2019/0303033 A1 | 10/2019 | Noguera Serra et al. |
| 2019/0303311 A1 | 10/2019 | Bilski et al. |
| 2019/0303323 A1 | 10/2019 | Swarbrick et al. |
| 2019/0303328 A1 | 10/2019 | Bilski et al. |
| 2021/0336622 A1 * | 10/2021 | Young ............... H03K 19/17736 |
| 2022/0224658 A1 * | 7/2022 | Jo ............... H04L 49/9021 |
| 2022/0405453 A1 * | 12/2022 | Pal ............... G06F 9/544 |
| 2022/0414028 A1 * | 12/2022 | Pope ............... G06F 13/287 |
| 2023/0094621 A1 * | 3/2023 | Dastidar ............... G06F 12/0828 |
| | | 711/118 |

OTHER PUBLICATIONS

Xilinx, Inc., "Versal: The First Adaptive Compute Acceleration Platform (ACAP)," WP505 (v1.1.1) Sep. 29, 2020, 21 pages.

Nelson Andrew et al: "Distributed Power Management of Real-Time Applications on a GALS Multiprocessor SOC", 2015 International Conference on Embedded Software (EMSOFT), IEEE, Oct. 4, 2015 (Oct. 4, 2015), pp. 147-156.

Nelson Andrew et al: "CoMik: A Predictable and Cycle-Accurately Composable Real-Time Microkernel", A 2014 Design, Automation & Test in Europe Conference & Exhibition (Date), EDAA, Mar. 24, 2014 (Mar. 24, 2014), pp. 1-4.

\* cited by examiner

DATA PROCESSING ARRAY INTERFACE HAVING INTERFACE TILES WITH MULTIPLE DIRECT MEMORY ACCESS CIRCUITS

TECHNICAL FIELD

This disclosure relates to integrated circuits and, more particularly, to an array interface for a data processing array, wherein the array interface includes interface tiles having a plurality of direct memory access circuits.

BACKGROUND

Integrated circuits (ICs) have evolved over time to provide increasingly sophisticated computing architectures. While some ICs utilize computing architectures that include a single processor, others include multiple processors. Still, other ICs include multiple processors arranged in an array. Such ICs are capable of providing significant computational power and a high degree of parallelism that extends well beyond the capabilities of single-processor architectures and even multi-core processor architectures.

SUMMARY

In one or more example implementations, an integrated circuit (IC) can include a data processing array including a plurality of compute tiles arranged in a grid. The IC can include an array interface coupled to the data processing array. The array interface includes a plurality of interface tiles. Each interface tile includes a plurality of direct memory access circuits. The IC can include a network-on-chip (NoC) coupled to the array interface. Each direct memory access circuit is communicatively linked to the NoC via an independent communication channel.

In one or more example implementations, an array interface for an IC can include a plurality of interface tiles. Each interface tile can include a stream switch connected to another stream switch of an adjacent compute tile of a data processing array or an adjacent memory tile of the data processing array. The stream switch is also connected to the stream switch of at least one adjacent interface tile of the array interface. Each interface tile can include a stream multiplexer-demultiplexer connected to the stream switch of the same interface tile. Each interface tile can include a plurality of direct memory access circuits. Each direct memory access circuit is connected to the stream multiplexer-demultiplexer of the same interface tile and to a NoC. The direct memory access circuits are configured to convert data streams received from the stream multiplexer-demultiplexer into memory-mapped transactions that are conveyed to the NoC. The direct memory access circuits are also configured to convert memory-mapped transactions received from the NoC into data streams conveyed to the stream multiplexer-demultiplexer.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to integrated circuits (ICs) and, more particularly, to an array interface for a data processing (DP) array, wherein the array interface includes interface tiles having a plurality of direct memory access (DMA) circuits. The DP array may include a plurality of tiles. The tiles include compute tiles or a mix of compute tiles and memory tiles. The DP array is configurable to perform desired computational activities by loading configuration data into the DP array. Once configured, the DP array is able to perform the computational activities. The configuration data loaded into the DP array, sometimes referred to as an "application," may specify a variety of operational parameters of the DP array including, but not limited to, particular kernels to be executed by the compute tiles, connectivity between the various tiles of the DP array, and the like.

In performing the computational activities, the DP array relies on the array interface to obtain input data from other circuits and/or systems and provide generated output data to such other circuits and/or systems. The other circuits and/or systems may be disposed in the same IC as the DP array or disposed in a system that is external to the IC in which the DP array is disposed. In accordance with the inventive arrangements described within this disclosure, the array interface is configured to include additional DMA circuitry that increases the data throughput in and out of the DP array. The additional DMA circuitry facilitates the conveyance of a larger quantity of data per unit time in and out of the DP array. This enhanced capability of the array interface leads to reduced latency in data transfers into and out of the DP array thereby increasing the overall throughput of the applications executing in the DP array.

Further aspects of the inventive arrangements are described below with reference to the figures.

Figure 1:
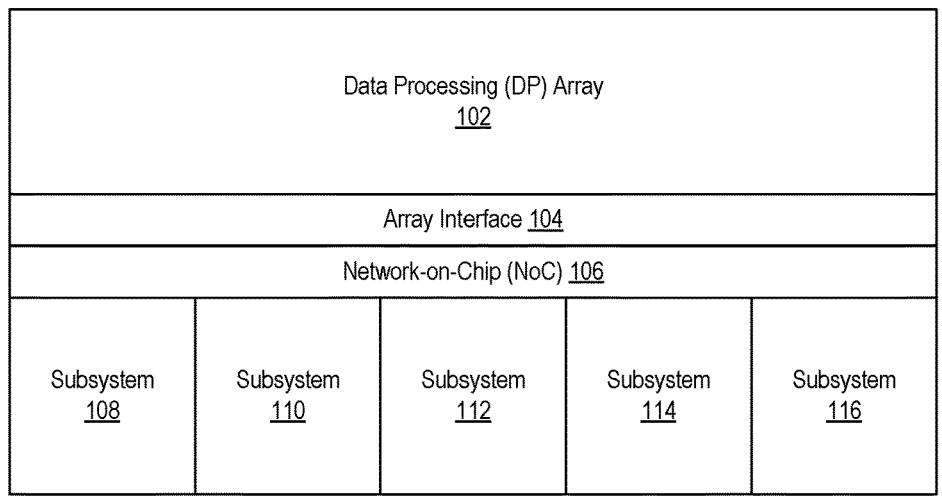
FIG. 1 illustrates an example of an electronic system.

FIG. 1 illustrates an example system 100. In one or more example implementations, system 100 is an electronic system that is implemented entirely within a single IC. System 100 may be implemented within a single IC package. In one aspect, system 100 is implemented using a single die disposed in a single IC package. In another aspect, system 100 is implemented using two or more interconnected dies disposed within the single IC package.

System 100 includes a DP array 102, an array interface 104, a network-on-chip (NoC) 106, and a plurality of subsystems 108, 110, 112, 114, and 116. In the example, DP array 102 couples to NoC 106 by way of array interface 104. Subsystems 108-116 are coupled to NoC 106. DP array 102 may communicate with one or more or all of the subsystems 108-116 via array interface 104 and NoC 106.

It should be appreciated that the number of subsystems illustrated in the example of FIG. 1 is for purposes of illustration. System 100 may include more or fewer subsystems than shown. The different subsystems may represent any of a variety of different types of electronic subsystems and/or circuits. For purposes of illustration, examples of subsystems 108-116 may include, but are not limited to, any combination of a processor system, programmable logic, hardwired circuit blocks (e.g., application-specific circuit blocks), and the like.

Figure 2:
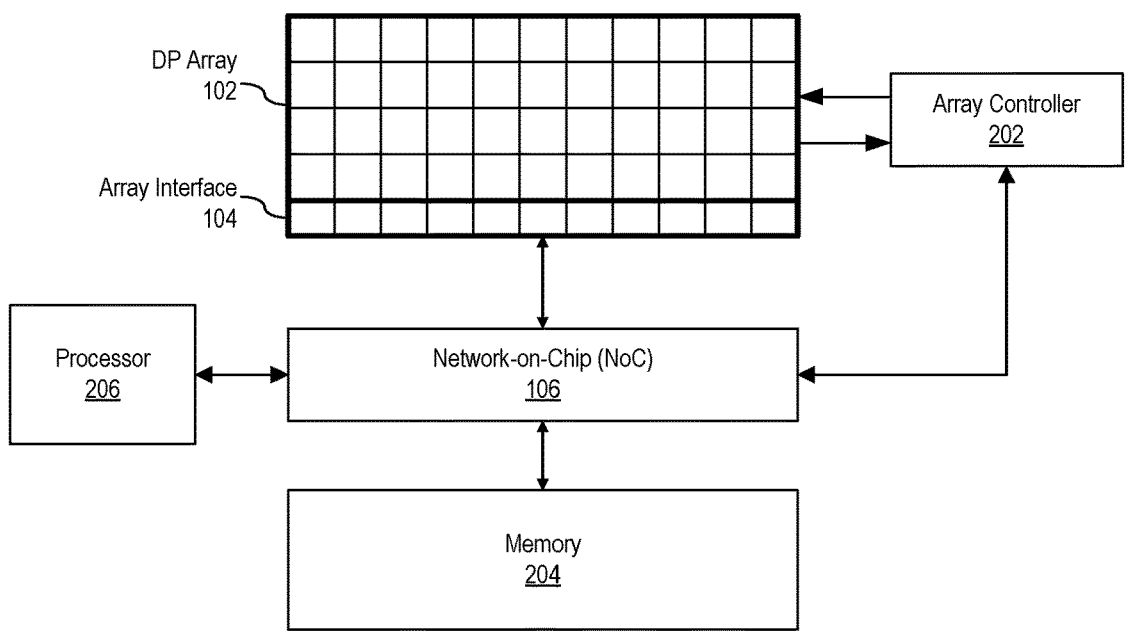
FIG. 2 illustrates another example implementation of an electronic system.

FIG. 2 illustrates another example implementation of system 100. In the example of FIG. 2, DP array 102, array interface 104, and NoC 106 are implemented in a same IC. In the example, an array controller 202 is illustrated that may also be located in the same IC as DP array 102. Memory 204 and processor 206 may or may not be disposed in the same IC as DP array 102. In some examples, an IC implementation of system 100 includes memory 204 and/or processor 206. In other examples, an IC implementation of system 100 does not include memory 204 and/or processor 206, where memory 204 and/or processor 206 are implemented in devices that are external to, and coupled to, the IC including DP array 102.

DP array 102 is formed of a plurality of circuit blocks referred to as tiles. As defined within this disclosure, the term "array tile" means a circuit block included in a DP array. Array tiles of DP array 102 may include only compute tiles or a mixture of compute tiles and memory tiles. Compute tiles and memory tiles are hardwired and are programmable. Array interface 104 includes a plurality of interface tiles. As defined within this disclosure, the term "interface tile" means a circuit block included in array interface. The interface tiles of array interface 104 communicatively link array tiles of DP array 102 to communicate with circuits outside of DP array 102, whether such circuits are disposed in the same die, a different die in the same IC package, or external to the IC package. Interface tiles also are hardwired and programmable. As defined within this disclosure, the term "tile" means an array tile and/or an interface tile. As such, a tile may refer to a compute tile, a memory tile, or an interface tile.

Array controller 202 is optionally included in system 100. Array controller 202 is communicatively linked to DP array 102 and to array interface 104. In one aspect, array controller 202 is dedicated to controlling operation of DP array 102 and array interface 104. Array controller 202 may be implemented as a state machine (e.g., a hardened controller) or as a processor. Whether implemented as a state machine or a processor, array controller 202 may be implemented as a hardwired circuit block or using programmable logic.

NoC 106 is a programmable interconnecting network for sharing data between endpoint circuits in an IC. The endpoint circuits can be disposed in DP array 102 or in the other subsystems 108-114. In the example of FIG. 2, one or both of memory 204 and/or processor 206 is an example of a subsystem such as subsystems 108-116 of FIG. 1. NoC 106 can include high-speed data paths with dedicated switching. NoC 106 also supports network connections. In an example, NoC 106 includes one or more horizontal paths, one or more vertical paths, or both horizontal and vertical path(s). NoC 106 is an example of the common infrastructure that is available within an IC to connect selected components and/or subsystems.

In general, the programmability of NoC 106 means that nets that are to be routed through NoC 106 are unknown until a design (e.g., application) is created for implementation within system 100. NoC 106 may be programmed by loading configuration data into internal configuration registers that define how elements within NoC 106 such as switches and interfaces are configured and operate to pass data from switch to switch and among the ingress/egress (e.g., interface) circuits of NoC 106 that connect to the endpoint circuits. NoC 106 is fabricated as part of system 100 (e.g., is hardwired) and is programmed to establish network connectivity between different master circuits and different slave circuits of a user circuit design.

In one or more examples, NoC 106, upon power-on, may implement selected data paths for use in configuring system 100. Upon power-on, NoC 106 may not implement any data paths or routes therein for implementing a user application at least until such time that NoC 106 has been configured with configuration data specifying routes for nets to connect endpoint circuits of a user application or design.

Memory 204 may be implemented as a random-access memory (RAM). In one or more example implementations, memory 204 may be implemented, e.g., embedded, in the same IC including DP array 102. Memory 204, for example, may be a RAM circuit implemented on the same die as DP array 102 or on a different die within the same IC package. Memory 204, for example, may be implemented as a High Bandwidth Memory (HBM). In another aspect, memory 204 is external to the IC including DP array 102. For example, memory 204 may be one or more RAM modules communicatively linked to the IC including DP array 102 (e.g., located on a same circuit board as the IC).

In one aspect, processor 206 is implemented, e.g., embedded, in the same IC including DP array 102. Processor 206 may be implemented as a hardwired processor within the IC or implemented using programmable logic. In another aspect, processor 206 is external to the IC including DP array 102. In that case, processor 206 may be part of another data processing system such as a host computer that is communicatively linked to the IC including DP array 102.

In the example of FIG. 2, DP array 102 and array interface 104 may operate under control of another circuit. That is, another circuit such as processor 206 and/or array controller 202 may control the configuration and operation of DP array 102 and/or array interface 104 over time. In the case where system 100 includes both processor 206 and array controller 202, processor 206 may execute an application and provide instructions, e.g., tasks or jobs, to array controller 202. Array controller 202 may execute the instructions to control configuration and/or operation of DP array 102. In other arrangements, array controller 202 may be omitted such that processor 206 controls configuration and/or operation of DP array 102. In that case, processor 206, when implemented in the same IC as DP array 102 and array interface 104, may include one or more direct connections to DP array 102 and/or array interface 104.

Figure 3:
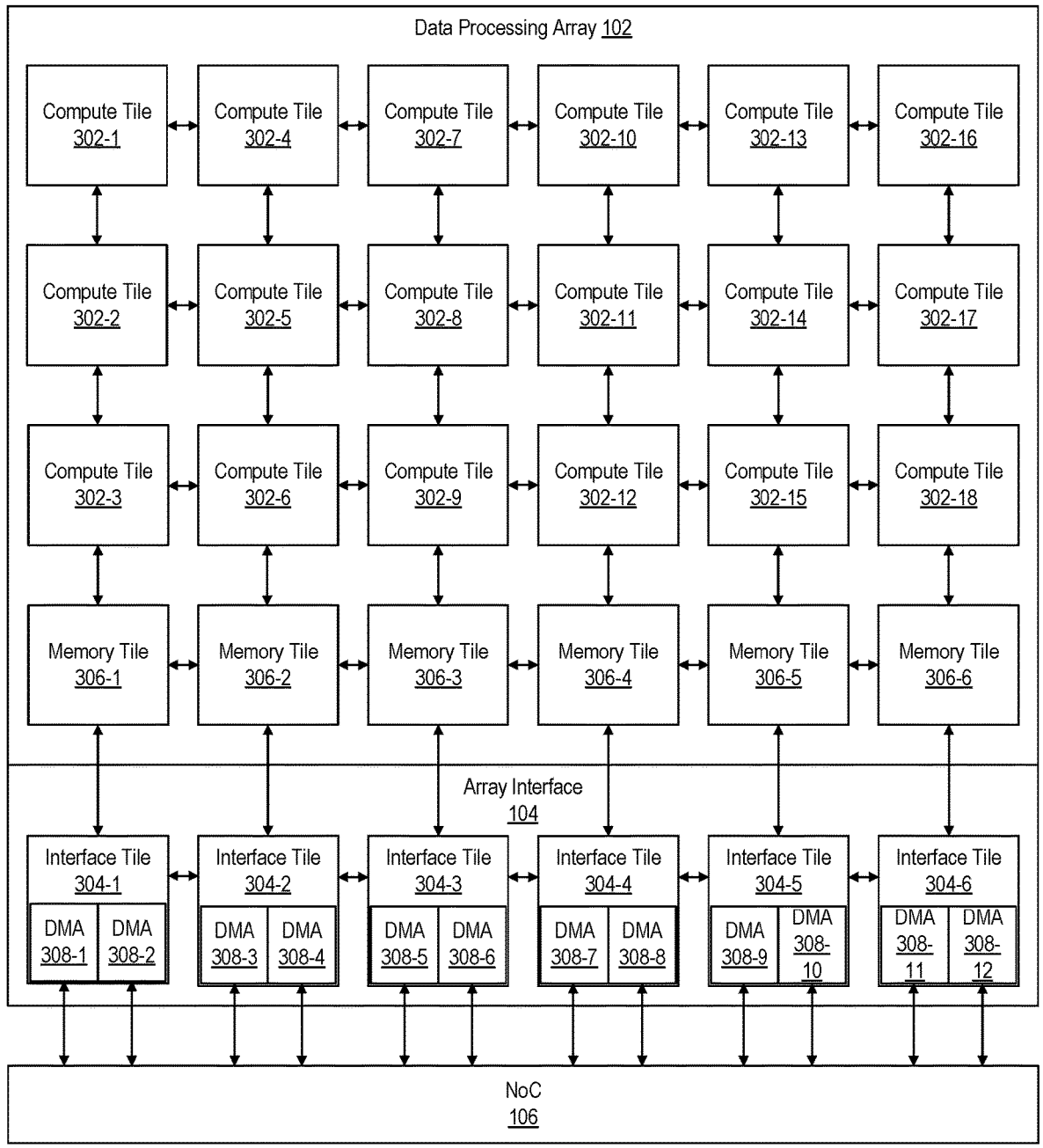
FIG. 3 illustrates an example implementation of a data processing (DP) array and an array interface of an electronic system.

FIG. 3 illustrates an example implementation of DP array 102 and array interface 104. In the example, DP array 102 includes compute tiles 302 and memory tiles 306. In the example of FIG. 3, compute tiles 302 and memory tiles 306 are arranged in a grid having a plurality of rows and columns. Interface tiles 304 are arranged in a row where the individual interface tiles 304 are aligned with the columns of the grid arrangement of DP array 102. Compute tiles 302 include compute tiles 302-1, 302-2, 302-3, 302-4, 302-5, 302-6, 302-7, 302-8, 302-9, 302-10, 302-11, 302-12, 302-13, 302-14, 302-15, 302-16, 302-17, and 302-18. Interface tiles 304 include interface tiles 304-1, 304-2, 304-3, 304-4, 304-5, and 304-6. Memory tiles 306 include memory tiles 306-1, 306-2, 306-3, 306-4, 306-5, and 306-6. In the example, each tile is coupled to an adjacent tile to the left (west), right (east), above (north), and below (south) if a tile is located in such position(s).

The example of FIG. 3 is provided for purposes of illustration only. The number of tiles in a given column and/or row, the number of tiles included in DP array 102 and/or array interface 104; the sequence or order of tile types (e.g., memory and compute tiles) in a column and/or row is for purposes of illustration and not limitation. Other arrangements may be included with varying numbers of tiles, rows, columns, mixtures of tile types, and the like. For example, rows of FIG. 3 are homogeneous in terms of tile type while columns are not. In other arrangements, rows may be heterogeneous in terms of tile type while columns are homogeneous. Further, additional rows of memory tiles 306 may be included in DP array 102. Such rows of memory tiles 306 may be grouped together without intervening rows of compute tiles 302 or distributed throughout DP array 102 such that rows of compute tiles 302 do intervene between rows or groups of rows of memory tiles 306.

In another example implementation of DP array 102, memory tiles 306 may be omitted such that the bottom row of compute tiles 302 couples directly to interface tiles 304. For example, with memory tiles 306 omitted, interface tile 304-1 would connect directly to compute tile 302-3, etc. In such cases, the various example implementations described herein may read data from and write data to memory 204 in lieu of memory tiles 306. Inclusion of memory tiles 306, however, may increase the data throughput of DP array 102 in that data may be stored closer to compute tiles 302 without having to continually read data from a RAM and/or write data to a RAM external to DP array 102.

In the example of FIG. 3, each of the interface tiles 304 includes a plurality of DMA circuits 308. For purposes of illustration, each interface tile 304 includes two DMA circuits 308. Interface tile 304-1 includes DMA circuits 308-1, 308-2; interface tile 304-2 includes DMA circuits 308-3, 308-4; interface tile 304-3 includes DMA circuits 308-5, 308-6; interface tile 304-4 includes DMA circuits 308-7, 308-8; interface tile 304-6 includes DMA circuits 308-9, 308-10; and interface tile 304-6 includes DMA circuits 308-11, 308-12.

Each of the DMA circuits 308 is capable of communicating with NoC 106 via an independent communication channel as shown. In one aspect, each DMA circuit 308 is connected to an interface circuit of NoC 106. Each DMA circuit 308 may connect to a different and independent interface circuit of NoC 106. The DMA circuits 308 within the same interface tile 304 are capable of operating concurrently such that each is capable of conveying one or more data streams concurrently with the other. This allows each interface tile 304 to convey data using both DMA circuits 308 therein concurrently to the NoC 106 and/or conveying data streams using both DMA circuits 308 therein concurrently to the DP array 102.

Figure 4:
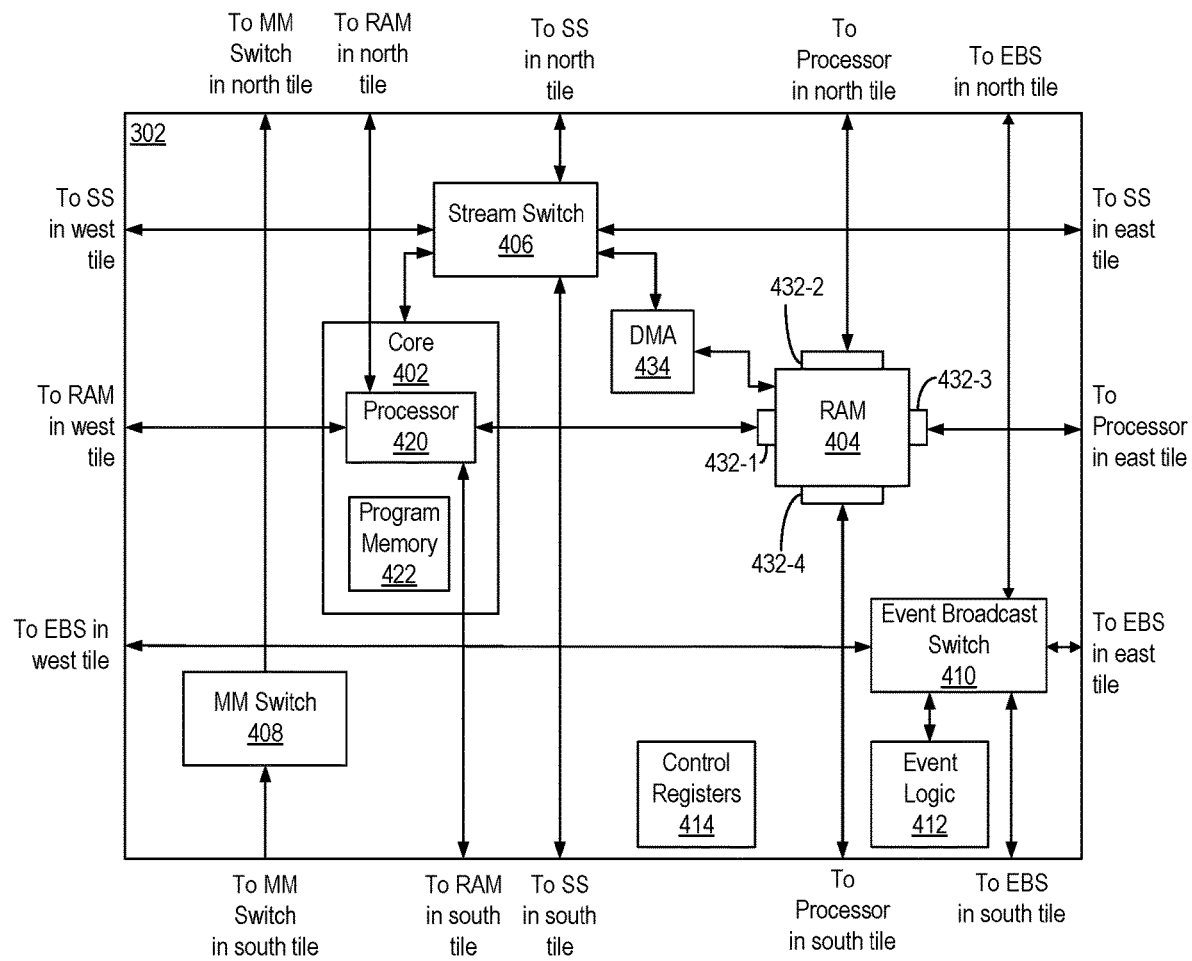
FIG. 4 illustrates an example implementation of a compute tile of a DP array.

FIG. 4 illustrates an example implementation of a compute tile 302. The example of FIG. 4 is provided to illustrate certain architectural features of compute tiles 302 and not as a limitation of the form of DP array 102 or the architecture of compute tiles 302 in general. Some connections between components and/or tiles are omitted for ease of illustration.

In the example, each compute tile 302 includes a core 402, a RAM 404, a stream switch 406, a memory-mapped switch 408 (e.g., abbreviated as "MM" switch in the figures), an event broadcast switch 410, event logic 412, control registers 414, and a direct memory access (DMA) circuit 434. Core 402 includes a processor 420 and a program memory 422. Control registers 414 may be written by memory-mapped switch 408 to control the operation of the various components included in compute tile 302. Though not shown, each memory component of compute tile 302 (e.g., program memory 422, control registers 414, and RAM 404) may be read and/or written via memory-mapped switch 408 for purposes of configuration and/or initialization.

Processor 420 may be any of a variety of different processor types. In one aspect, processor 420 is implemented as a vector processor. Program memory 422 may be loaded, e.g., by way of loading configuration data, with one or more sets of executable instructions typically referred to as "kernels." Compute tiles 302 are capable of performing data processing operations and operating on a large amount of data through execution of the kernels.

Each core 402, e.g., processor 420, is directly connected to the RAM 404 located in the same compute tile 302 through a memory interface 432. Within this disclosure, a memory interface is referred to as a "local memory interface" when the memory interface is used by circuits in the same tile to access a RAM. Memory interface 432-1 is an example of a local memory interface since processor 420 in the same tile utilizes the memory interface to access RAM 404. By comparison, a memory interface used by circuitry external to the tile to access RAM 404 is referred to as an adjacent memory interface. Memory interfaces 432-2, 432-3, and/or 432-4 are examples of adjacent memory interfaces because such memory interfaces are used by circuitry in other adjacent tiles to access RAM 404.

As such, each processor 420 is capable of accessing (e.g., reading and/or writing) the RAM 404 in the same compute tile 302 and one or more other RAMs 404 in adjacent tiles via standard read and write operations directed to memory interfaces. Processor 420 is capable of executing program code stored in program memory 422. RAM 404 is configured to store application data. RAM 404 may be read and/or written via memory-mapped switch 408 for purposes of configuration and/or initialization. RAM 404 may be read and/or written by a processor 420 and/or by DMA circuits 434 during runtime.

DMA circuit 434 is capable of reading and writing data to RAM 404 located in the same compute tile 302. DMA circuit 434 may receive data via stream switch 406 from a source outside of compute tile 302 and store such data in RAM 404. DMA 434 may read data from RAM 404 and output the data to stream switch 406 for conveyance to one or more other destinations outside of compute tile 302.

Each core 402, e.g., processor 420, may be directly connected to RAMs 404 located in adjacent compute tiles 302 (e.g., in the north, south, east, and/or west directions) via memory interfaces. As such, processor 420 may directly access such other adjacent RAMs 404 in the same manner as processor 420 is able to access the RAM 404 located in the same compute tile 302 without initiating read or write transactions over stream switch 406 and/or without using DMA circuit 434. As an illustrative example, processor 420 of compute tile 302-5 may read and/or write to the RAM 404 located in compute tiles 302-5, 302-2, 302-4, and 302-6 without submitting read or write transactions over stream switches 406 and/or using DMA circuits 434. It should be appreciated, however, that a processor 420 may initiate read and write transactions to the RAM 404 of any other compute tile 302 and/or memory tile 306 via stream switches 406 and DMA circuits 434.

Processors 420 may also include direct connections, referred to as cascade connections (not shown), to processors 420 of adjacent cores (e.g., in the north, south, east, and/or west directions) that allow direct sharing of data stored in internal registers (e.g., an accumulation register) of processor 420 with other processors 420. This means that data stored in one or more internal registers of one processor 420 may be conveyed directly to one or more internal registers of a different processor 420 without first writing such data to RAM 404 and/or conveying such data over stream switches 406.

Event logic 412 also may be configured by control registers 604. In the example of FIG. 4, event logic 412 is coupled to event broadcast switch 410. The configuration data loaded into control registers 414 defines the particular events that may be detected locally within compute tile 302.

Event logic 412 is capable of detecting a variety of different events, per control registers 414, originating from and/or relating to, DMA circuits 434, memory-mapped switch 408, and/or stream switch 406. Examples of events may include, but are not limited to, DMA finished transfer, a lock being released (e.g., a lock on RAM 404 not shown), a lock (e.g., on RAM 404) being acquired, or other events relating to the start or end of data flow through compute tile 302. Event logic 412 may be configured by control registers 414 in compute tile 302. Event logic 412 may provide such events to event broadcast switch 410. Event broadcast switch 410, as shown, is coupled to the event broadcast switch (if available) in each of the west, east, north, and south adjacent tiles. As such, event broadcast switch 410 is capable of propagating events generated internally by event logic 412 and/or events received from outside of the compute tile 302 on to other tiles in DP array 102 and/or array circuit 104.

In one or more example implementations, event broadcast switch 410 is capable of gathering broadcast events from one or more or all directions. In some cases, event broadcast switch 410 is capable of performing a logical "OR" of the signals and forwarding the results in one or more or all directions. Each output from event broadcast switch 410 may include a bitmask that is configurable by configuration data loaded into control registers 414. The bitmask determines which events are broadcast in each direction on an individual basis. Such bitmasks, for example, may eliminate unwanted or duplicative propagation of events.

Figure 5:
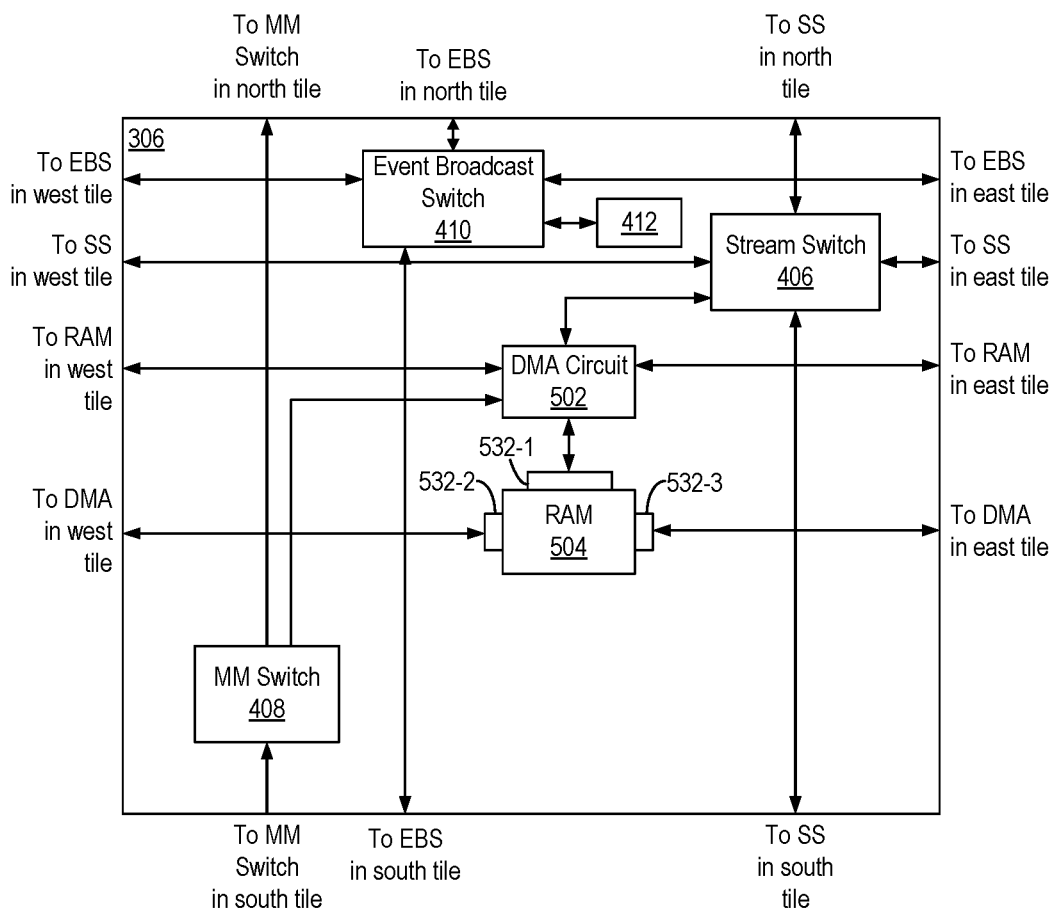
FIG. 5 illustrates an example implementation of a memory tile of a DP array.

FIG. 5 illustrates an example implementation of a memory tile 306. The example of FIG. 5 is provided to illustrate certain architectural features of memory tiles 306 and not as a limitation of the form of DP array 102 or architecture of memory tiles 306 in general. Some connections between components and/or tiles are omitted for ease of illustration.

Each memory tile 306 includes a stream switch 406, a memory-mapped switch 408, a DMA circuit 502, a RAM 504, an event broadcast switch 410, event logic 412, and/or control registers 414. Control registers 414 may be written by memory-mapped switch 408 to control the operation of the various components illustrated in memory tile 306. Though not shown, each memory component of memory tile 306 (e.g., RAM 504 and control registers 414) may be read and/or written via memory-mapped switch 408 for purposes of configuration and/or initialization.

Each DMA circuit 502 of a memory tile 306 is coupled to the RAM 504 within the same memory tile 306 via a local memory interface 532-1 and may be coupled to one or more RAMs 504 of other adjacent memory tiles 306. In the example of FIG. 5, each DMA circuit 502 is capable of accessing (e.g., reading and/or writing) the RAM 504 included within the same memory tile 306 via local memory interface 532-1. RAM 504 includes adjacent memory interfaces 532-2 and 532-3 through which the DMA circuits of the east and west memory tiles 306 may access RAM 504. For example, the DMA circuit 502 of memory tile 306-2 may access the RAM 504 of memory tile 306-1 and/or the RAM 504 of memory tile 306-3. DMA circuit 502 may place data read from RAM 504 onto stream switch 406 and write data received via stream switch to RAM 504.

The event broadcast switch 410 and event logic 412 within memory tile 306 may operate substantially similar to the event broad switch 410 and event logic 412 described in connection with FIG. 4. Similarly, where memory-mapped switch 408 is used for purposes of configuration and initialization of memory tile 306, stream switch 406 is used for conveying data during runtime.

Figure 6:
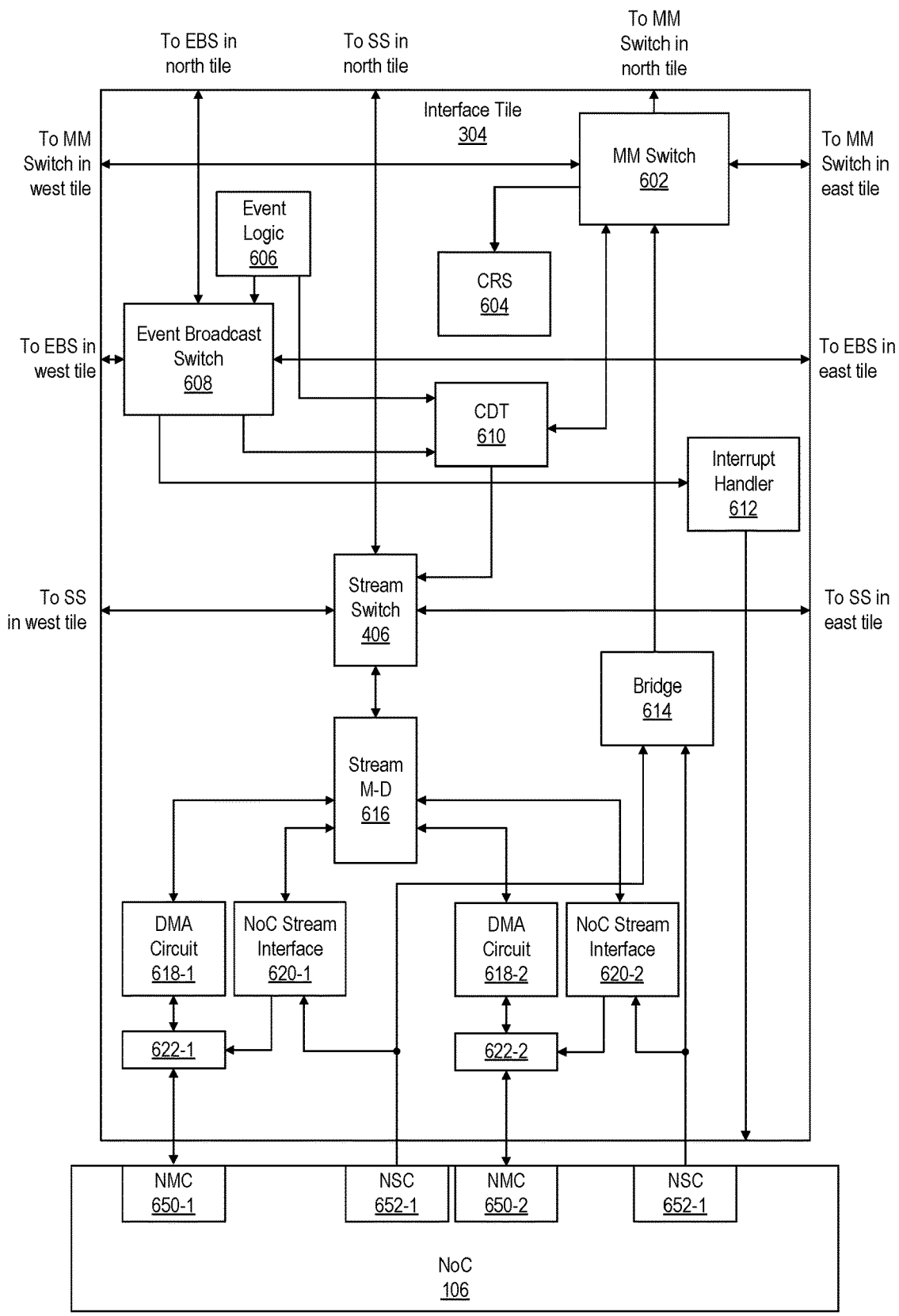
FIG. 6 illustrates an example implementation of an interface tile of an array interface for a DP array.

FIG. 6 illustrates an example implementation of an interface tile 304 of the array interface 104. In the example of FIG. 6, interface tile 304 includes a stream switch 406, a memory-mapped switch 602, control registers 604 (e.g., abbreviated as "CRS" 604 in FIG. 6), event logic 606, an event broadcast switch 608, a control, debug, and trace (CDT) circuit 610, an interrupt handler 612, a bridge 614, a stream multiplexer-demultiplexer 616, a plurality of DMA circuits 618, a plurality of NoC stream interfaces 620, and a plurality of switches 622.

Memory-mapped switch 602 may be connected to the memory-mapped switches in the adjacent tiles to the west, east, and north. For example, memory-mapped switch 602 may include one or more memory-mapped interfaces where a memory-mapped interface has a master and slave that connects to the memory-mapped switches in the west, east, and north adjacent tiles. Unlike the memory-mapped switches 408 of the array tiles, the memory-mapped switch 602 of interface tile 304 is capable of communicating with the memory-mapped switches in the adjacent west and east interface tiles 304.

Accordingly, memory-mapped switch 602 is capable of moving data (e.g., configuration, control, and/or debug data) from one interface tile 304 to another to reach a particular or correct interface tile 304 and direct the data north to a particular target array tile or array tiles. If memory-mapped transactions are received from another circuit within a particular interface tile 304, for example, memory-mapped switch 602 is capable of distributing the transaction(s) horizontally, e.g., to other interface tiles 304 within array interface 104.

In the example, control registers 604 are connected to memory-mapped switch 602 and may be read and/or written via memory-mapped switch 602. Through memory-mapped switch 602, configuration data may be loaded into control registers 604 to control various functions and operations performed by the various components within interface tile 304. For purposes of illustration control registers 604 are not shown as being coupled to the various circuit blocks of interface tile 304. It should be appreciated, however, that control registers 604 may be connected to the various circuit blocks of interface tile 304 via control signals to control operational features of such circuit blocks (e.g., event logic 606, event broadcast switch 608, CDT 610, interrupt handler 612, stream switch 406, bridge 614, stream multiplexer-demultiplexer 616, DMA circuits 618, NoC stream interfaces 620, and/or switches 622.

Memory-mapped switch 602 is coupled to NoC 106 via bridge 614. Bridge 614 is capable of converting memory-mapped data transfers from NoC 106 corresponding to configuration data, control data, and/or debug data into memory-mapped data that may be received by memory-mapped switch 602.

Event logic 606 may be configured by control registers 604. In the example of FIG. 6, event logic 606 is coupled to event broadcast switch 608 and to CDT circuit 610. The configuration data loaded into control registers 604 defines the particular events that may be detected locally within interface tile 304. Event logic 606 is capable of detecting a variety of different events, per control registers 604, originating from and/or relating to, DMA circuits 618, memory-mapped switch 602, stream switch 406, and/or NoC stream interfaces 620. Examples of events may include, but are not limited to, DMA finished transfer, a lock being released, a lock being acquired, or other events relating to the start or end of a data flow through interface tile 304. Event logic 606 may provide such events to event broadcast switch 608 and/or to CDT circuit 610. In another example implementation, event logic 606 may not have a direct connection to CDT circuit 610, but rather connect to CDT circuit 610 via event broadcast switch 608.

The event broadcast switch 608 and event logic 606 may operate similar to the event broadcast switch and logic described in connection with the compute tiles 302 and the memory tiles 306. In the example of FIG. 6, event broadcast switch 608 provides an interface between the event broadcast network formed of the event broadcast switches in DP array 102 and interface tiles 304. Event broadcast switch 608 is coupled to the event broadcast switches in the adjacent tiles to the west, east, and north of interface tile 304.

Event broadcast switch 608 is capable of sending events generated internally by event logic 606, events received from other interface tiles 304, and/or events received from array tiles (e.g., compute tiles 302 and/or memory tiles 306) on to other tiles. Because events may be broadcast among interface tiles 304, events may reach any array tile in DP array 102 by traversing through event broadcast switches 608 in interface tiles 304 to a particular interface tile 304 and then traversing up to one or more target (e.g., intended) array tiles in DP array 102.

In another example, events also may be sent from event broadcast switch 608 to other circuit blocks and/or subsystems in the same IC. The event data may be forwarded to CDT 610 and on to stream switch 406 for conveyance through NoC 106. For example, CDT circuit 610 is capable of packetizing received events and sending the packetized events to stream switch 406.

In one or more example implementations, event broadcast switch 608 is capable of gathering broadcast events from one or more or all directions. In some cases, event broadcast switch 608 is capable of performing a logical "OR" of the signals and forwarding the results in one or more or all directions (e.g., including to CDT circuit 610). Each output from event broadcast switch 608 may include a bitmask that is configurable by configuration data loaded into control registers 604. The bitmask determines which events are broadcast in each direction on an individual basis. Such bitmasks, for example, may eliminate unwanted or duplicative propagation of events.

Interrupt handler 612 is coupled to event broadcast switch 608 and is capable of receiving events that are broadcast from event broadcast switch 608. In one or more example implementations, interrupt handler 612 may be configured by configuration data loaded into control registers 604 to generate interrupts to NoC 106 or another interconnect on the IC in response to selected events and/or combinations of events from event broadcast switch 608 (e.g., DP array 102 generated events and/or events generated within interface tile(s) 304). Interrupt handler 612 is capable of generating interrupts, based upon the configuration data, to circuits and/or subsystems of the same IC external to DP array 102 and/or array interface 104. In another aspect, interrupts may be conveyed to system(s) external to the IC in which DP array 102 and/or array interface 104 is implemented. In one aspect, the interrupts may be conveyed via interrupt circuitry (not shown) directly to such other circuits and/or subsystems. In another aspect, interrupt handler 612 may be connected to NoC 106 and convey the interrupts via NoC 106.

Stream switch 406 is connected to the stream switches in the west, east, and north adjacent tiles. Stream switch 406 is also coupled to DMA circuits 618 and NoC stream interfaces 620 through stream multiplexer-demultiplexer (M-D) 616. Stream switch 406 may be configurable by configuration data loaded into control registers 604. Stream switch 406, for example, may be configured to support packet-switched and/or circuit-switched operation based upon the configuration data. Further, the configuration data defines the particular tiles, whether array tiles and/or other interface tiles, to which stream switch 406 communicates. In general, referring to DP array 102 and array interface 104, the configuration data loaded into the various tiles defines the logical connections established among the stream switches 406 during operation (e.g., runtime operation). For example, referring to interface tile 304, the configuration data defines the particular array tile(s) in the column of array tiles directly above the interface tile 304 to which stream switch 406 communicates.

Stream M-D 616 may include a multiplexer that receives data streams from DMA circuit 618-1, DMA circuit 618-2, NoC stream interface 620-1, and/or NoC stream interface 620-2. Stream M-D 616 is capable of multiplexing the received data streams and forwarding the multiplexed data streams to stream switch 406. Stream switch 406 selectively conveys different ones of the received data streams to the west, east, or north adjacent tiles. Stream M-D 616 may include a demultiplexer that receives data streams from stream switch 406 and selectively demultiplexes the data streams to convey different ones of the received data streams to DMA circuit 618-1, DMA circuit 618-2, NoC stream interface 620-1, and/or NoC stream interface 620-2. For example, stream M-D 616 may be programmed by configuration data stored in control registers 604 that dictates which data streams to route to DMA circuit 618-1, DMA circuit 618-2, NoC stream interface 620-1, and/or NoC stream interface 620-2.

DMA circuits 618 convert the data streams from stream M-D 616 to memory-mapped transactions that are sent on to NoC 106. Similarly, DMA circuits 618 convert memory-mapped transactions received from NoC 106 into data streams that are forwarded to stream M-D 616. NoC stream interfaces 620 forward data streams received from NoC 106 to stream M-D 616. Similarly, NoC stream interfaces 620 forward data streams received from stream M-D 616 to NoC 106. For example, NoC stream interfaces 620 convey data streams received from stream M-D to NoC 106 by way of switch 622 over the data portion of the communication bus (e.g., without utilizing the address bus portion of the bus). Address information, for example, may be embedded in the data stream itself.

Each of switches 622 accepts data from the DMA circuit 618 attached thereto or the NoC stream interface 620 attached thereto, arbitrates among the data, and forwards the data to NoC 106. In the example, switches 622 are coupled to NoC master circuits (NMCs) 650. NoC slave circuits (NSCs) 652 are connected to NoC stream interfaces 620 and to bridge 614. In one or more example implementations, DMA circuits 618 include hardware synchronization circuitry that may be used to synchronize one or more channels included in each of DMA circuits 618 with a master that polls and drives the lock requests. For example, the master may be another circuit or subsystem within the IC in which interface tile 304 is disposed. The master may also receive an interrupt generated by the hardware synchronization circuitry within DMA circuit 618.

In one or more example implementations, DMA circuits 618 are capable of accessing a memory. As discussed, one or more of the subsystems 108-116 may implement such a memory. Alternatively, the memory may be located external to the IC. For example, DMA circuits 618 and/or NoC stream interfaces 620 are capable of receiving data streams from array tiles of DP array 102 and sending the data streams to the memory through NoC 106. Similarly, the DMA circuits 618 are capable of receiving memory-mapped data originating from the memory and/or other subsystem(s) and providing the data, in the form of a data stream, to stream M-D 616 for conveyance to other tiles. NoC stream interfaces 620 are capable of receiving data streams originating from the memory and/or other subsystem(s) and providing the data streams to stream M-D 616 for conveyance to other tiles.

In one or more example implementations, DMA circuits 618 include security bits that may be set using certain security registers included in interface tile 304. The security registers may be included in control registers 604 or implemented independently and separately from control registers 604. In one aspect, memory and/or subsystems communicatively linked to interface tile 304 via NoC 106 may be divided into different regions or partitions where the DP array 102, or certain array tiles thereof referred to as a partition, are only permitted to access particular regions of the memory and/or subsystems. The security bits within DMA circuits 618 may be set so that array tiles of DP array 102, by way of DMA circuits 618, is/are only able to access the particular region(s) of memory and/or subsystems that are allowed per the security bits. For example, an application implemented in DP array 102 or in a partition thereof (e.g., a subset of array tiles) may be restricted to accessing only particular regions of memory and/or the subsystems, restricted to only reading from particular regions of memory, and/or restricted from writing to the memory entirely using this mechanism.

The security bits within DMA circuits 618 that control access to the memory and/or other subsystems may be implemented to control DP array 102 as a whole or may be implemented in a more granular way where access to the memory and/or other subsystems may be specified and/or controlled on a per array tile basis.

CDT circuit 610 is capable of performing control, debug, and trace operations within interface tile 304. Regarding debug, each of the registers located in interface tile 304 is mapped onto the memory map accessible via memory-mapped switch 602. CDT circuit 610 may include circuitry such as, for example, trace hardware, trace buffers, performance counters, and/or stall logic. Trace hardware of CDT circuit 610 is capable of collecting trace data. Trace buffers of CDT circuit 610 are capable of buffering trace data. CDT circuit 610 is further capable of outputting the trace data to stream switch 406.

In one or more example implementations, CDT circuit 610 is capable of collecting data, e.g., trace and/or debug data, packetizing such data, and then outputting the packetized data through stream switch 406. For example, CDT circuit 610 is capable of outputting packetized data and providing such data to stream switch 406. Control registers 604 can be read or written during debugging via memory-mapped transactions through the memory-mapped switch 602 of the respective interface tile. Similarly, performance counters within CDT circuit 610 can be read or written during profiling via memory-mapped transactions through the memory-mapped switch 602 of the respective interface tile 304.

In one or more example implementations, CDT circuit 610 is capable of receiving any events propagated by event broadcast switch 608 or selected events per the bitmask utilized by the event broadcast switch 608 that is coupled to CDT circuit 610. CDT circuit 610 is further capable of receiving events generated by event logic 606. For example, CDT circuit 610 is capable of receiving broadcast events from array tiles, interface tile 304. CDT circuit 610 is capable of packing, e.g., packetizing, a plurality of such events together in a packet and associating the packetized events with timestamp(s). CDT circuit 610 is further capable of sending the packetized events over stream switch 406 to destinations external to interface tile 304. Events may be sent by way of stream switch 406 and stream M-D 616 to NoC 106 via DMA circuits 618, and/or NoC stream interfaces 620.

In the examples of FIGS. 4, 5, and 6, the stream switches 406 may be implemented with a larger number of ports and channels to accommodate the increased connectivity of the interface tiles 304 to NoC 106. The increased number of ports and channels allows the stream switches 406 to ensure that the higher level of data throughput provided from the interface tiles 304 continues into DP array 102.

Figure 7:
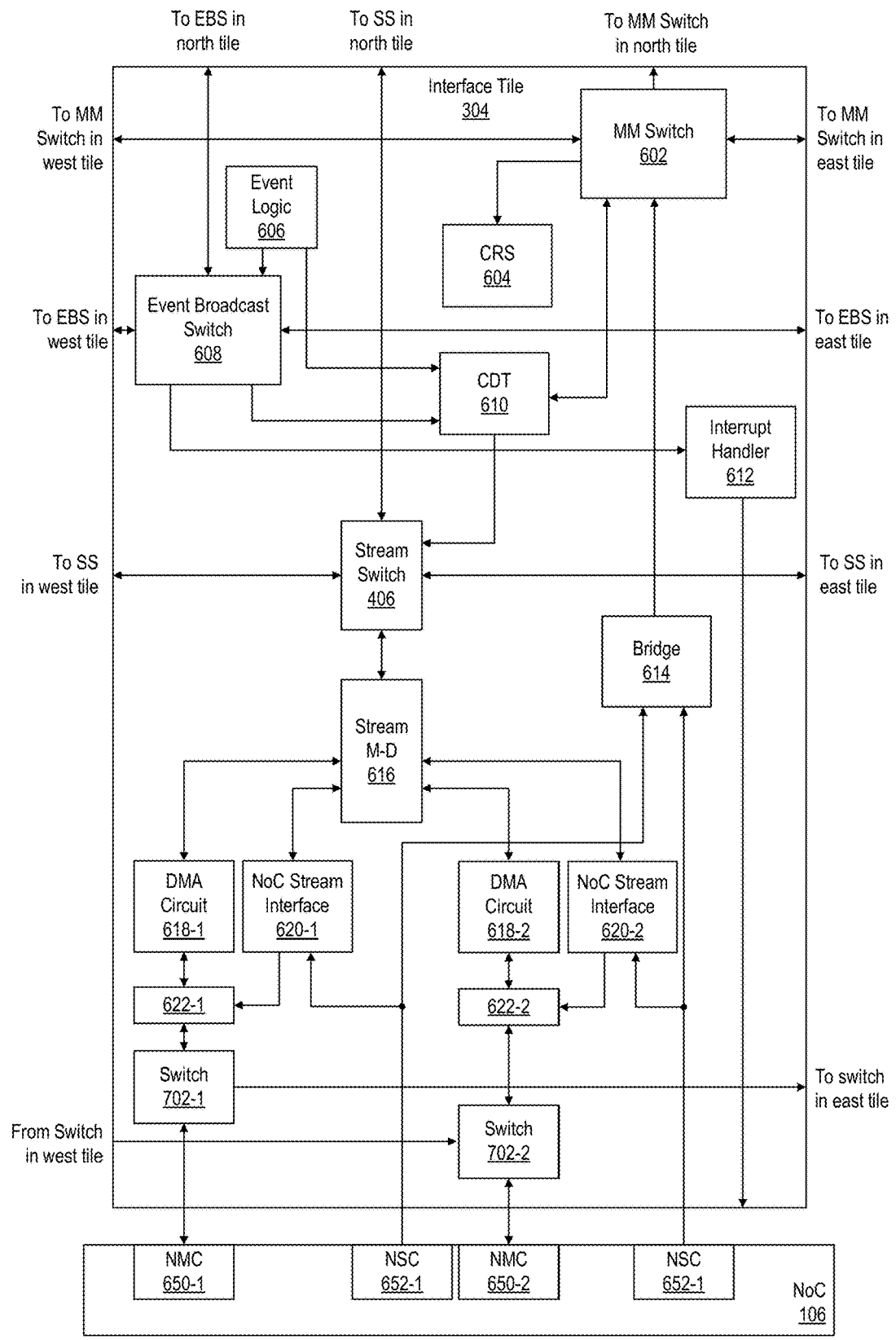
FIG. 7 illustrates another example implementation of an interface tile for an array interface for a DP array.

FIG. 7 illustrates another example implementation of an interface tile 304 of the array interface 104. In the example of FIG. 7, switches 702 have been added. As shown, switch 702-1 and switch 702-2 have been added. Switch 702-1 is connected to switch 622-1 and NMC 650-1. Switch 702-1 also connects to the switch 702-2 in the east adjacent interface tile. Switch 702-2 is connected to switch 622-2 and NMC 650-2. Switch 702-2 is also connected to the switch 702-1 in the west adjacent interface tile.

Switches 702 provide additional flexibility for routing data flows into and out of DP array 102 with respect to the NoC 106. That is, since nets for user applications are routed through the NoC 106 and use ingress/egress points corresponding to NMCs 650 and NSCs 652, respectively, inclusion of switches 702 provides greater flexibility in routing nets through NoC 106. The additional switching capability provided within the interface tiles 304 by inclusion of switches 702 alleviates routing congestion that may occur by allowing data from a particular interface tile 304 to enter NoC 106 by way of a different interface circuit than would be the case were switches 702 omitted. NMCs 650 are examples of interface circuits for NoC 106.

For example, data from DMA circuit 618 or NoC stream interface 620 may enter NoC 106 via NMC 650-1 or via the NMC 650 in the east adjacent interface tile based on the programming of switch 702-1. Thus, programming switch 702-1 and the switch 702-2 in the east adjacent tile provides a selection mechanism for determining where DMA circuit 618-1 and/or NoC stream interface 620-1 couples to NoC 106. In this regard, switches 702 may be referred to as "selector switches" in that programming such switches selects the connection point of certain circuits (e.g., DMA circuits 618 and/or NoC stream interfaces 620) to the NoC 106. DMA circuit 618-1 and/or NoC stream interface 620-1 may enter NoC 106 via NMC 650-1 or via another NMC 650 not shown that is located below the east adjacent interface tile 304. Thus, switches 702 are programmable to connect different ones of the interface circuits of NoC 106 to different ones of the interface tiles 304. This flexibility allows the implementation tools to avoid overly congested interface circuits when routing nets into, out of, and/or through NoC 106. Similarly, routing congestion is alleviated by allowing data directed to a particular interface tile 304 to exit the NoC 106 by way of an NSC 652 that, but for inclusion of switches 720, would need to exit the NoC 106 via a different egress point (e.g., a different NSC 652).

Referring to FIGS. 6 and 7, both example interface tiles 304 provide increased connectivity from the DP array 102 to the NoC 106. The inclusion of multiple DMA circuits 618 and multiple NoC stream interfaces 620 allows a larger amount of data to be conveyed between DP array 102 and NoC 106 on a per interface tile 304 basis. This translates into a significantly greater amount of data being conveyed between the NoC 106 and DP array 102 as a whole (e.g., for a given application or applications implemented in the DP array 102). As discussed, the ability to convey larger amounts of data, for example, between any of the subsystems 108-116 and DP array 102 increases data throughput and reduces latency. Data may be moved from a memory into DP array 102, for example, using twice the bandwidth than had a single DMA circuit 618 and/or single NoC stream interface 620 been included in interface tile 304.

The flexibility added by inclusion of switches 702 also helps to alleviate the additional congestion that may arise in the NoC 106 and competition for access to NMCs 650 and/or NSCs 652 by virtue of inclusion of the multiple DMA circuits 618 and multiple NoC stream interfaces 620 supporting a larger number of connections to the NoC 106 per interface tile. In cases, for example, where the bandwidth of a particular DMA circuit 618 and/or NoC stream interface 620 of a selected interface tile 304 is not being fully utilized, the switch 702 connected to that DMA circuit 618 and NoC stream interface 620 may be programmed to accept data from an adjacent DMA circuit and/or stream switch.

Figure 8:
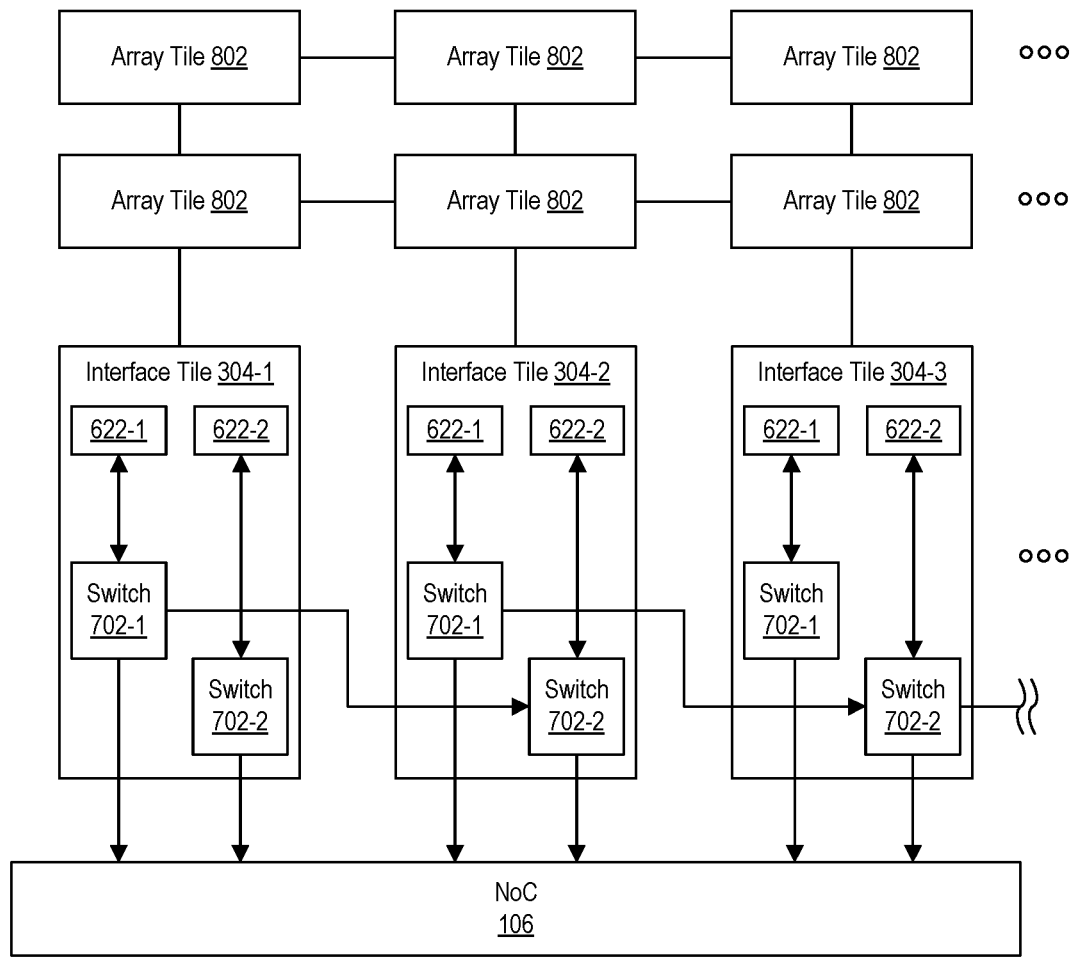
FIG. 8 illustrates an example of the connectivity between interface tiles of an array interface for a DP array.

FIG. 8 illustrates an example implementation of the connectivity between interface tiles 304 of the array interface 104 effectuated by switches 702. The example of FIG. 7 illustrates how each switch 702-1 (with the exception of the switch 702-1 of the rightmost interface tile 304-6 of FIG. 3, for example) communicatively links to the switch 702-2 of the east adjacent interface tile 304. Each switch 702-2 (with the exception of the first switch 702-2 of interface tile 304-1) is connected to switch 702-1 of the west adjacent interface tile 304. In this regard, switch 702-2 of interface tile 304-1 may be omitted. Similarly, switch 702-1 of the right-most interface tile 304 (e.g., interface tile 304-6) may be omitted.

In the example of FIG. 8, each interface tile 304 is aligned with a column of array tiles 802 (e.g., compute tiles 302 or a combination of compute tiles 302 and memory tiles 306). That is, one interface tile 304 is aligned with one column of array tiles 802. Each interface tile 304 includes two DMA circuits (not shown).

Figure 9:
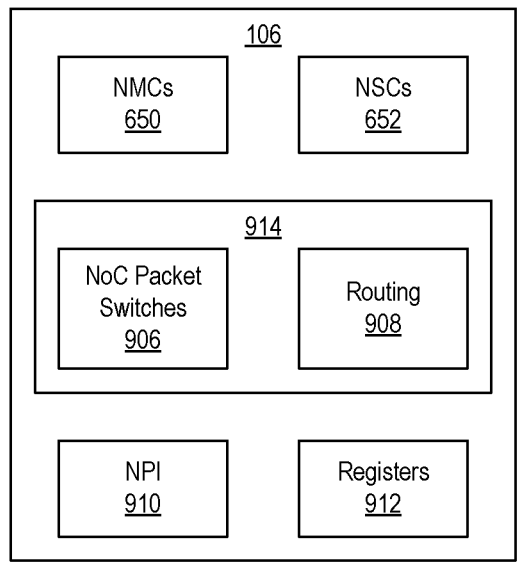
FIG. 9 illustrates an example implementation of a network-on-chip (NoC) for use with the electronic system of FIG. 1.

FIG. 9 illustrates an example implementation of NoC 106. NoC 106 includes NMCs 650, NSCs 652, a network 914, NoC peripheral interconnect (NPI) 910, and registers 912. Each NMC 650 is an ingress circuit that connects an endpoint circuit to the NoC 106. Each NSC 652 is an egress circuit that connects NoC 106 to an endpoint circuit. NMCs 650 are connected to NSCs 652 through network 914. In an example, network 914 includes NoC packet switches 906 (NPSs) and routing 908 between NoC packet switches 906. Each NoC packet switch 906 performs switching of NoC packets. NoC packet switches 906 are connected to each other and to NMCs 650 and NSCs 652 through routing 908 to implement a plurality of physical channels. NoC packet switches 906 also support multiple virtual channels per physical channel.

NPI 910 includes circuitry to program NMCs 650, NSCs 652, and NoC packet switches 906. For example, NMCs 650, NSCs 652, and NoC packet switches 906 can include registers 912 that determine functionality thereof. NPI 910 includes a peripheral interconnect coupled to registers 912 for programming thereof to set functionality. Registers 912 in NoC 106 support interrupts, Quality of Service (QoS), error handling and reporting, transaction control, power management, and address mapping control. Registers 912 can be initialized in a usable state before being reprogrammed, such as by writing to registers 912 using write requests. Configuration data for NoC 106, DP array 102, and/or array interface 104 can be stored in a non-volatile memory (NVM), e.g., as part of a programming device image (MI) specifying configuration data for the various components and/or subsystems of the IC (e.g., including DP array 102 and/or array interface 104), and provided to NPI 910 for programming NoC 106 and/or other endpoint circuits.

NMCs 650 are traffic ingress points. NSCs 652 are traffic egress points. NMCs 650 and NSCs 652 are examples of interface circuits of NoC 106. Endpoint circuits coupled to NMCs 650 and NSCs 652 can be hardened circuits. In another aspect, one or more of NMCs 650 and/or NSCs 652 may be circuits implemented in programmable logic (e.g., where programmable logic is included in the IC as one or more of subsystems 108-116). A given endpoint circuit can be coupled to more than one NMC 650 or more than one NMC 652.

Figure 10:
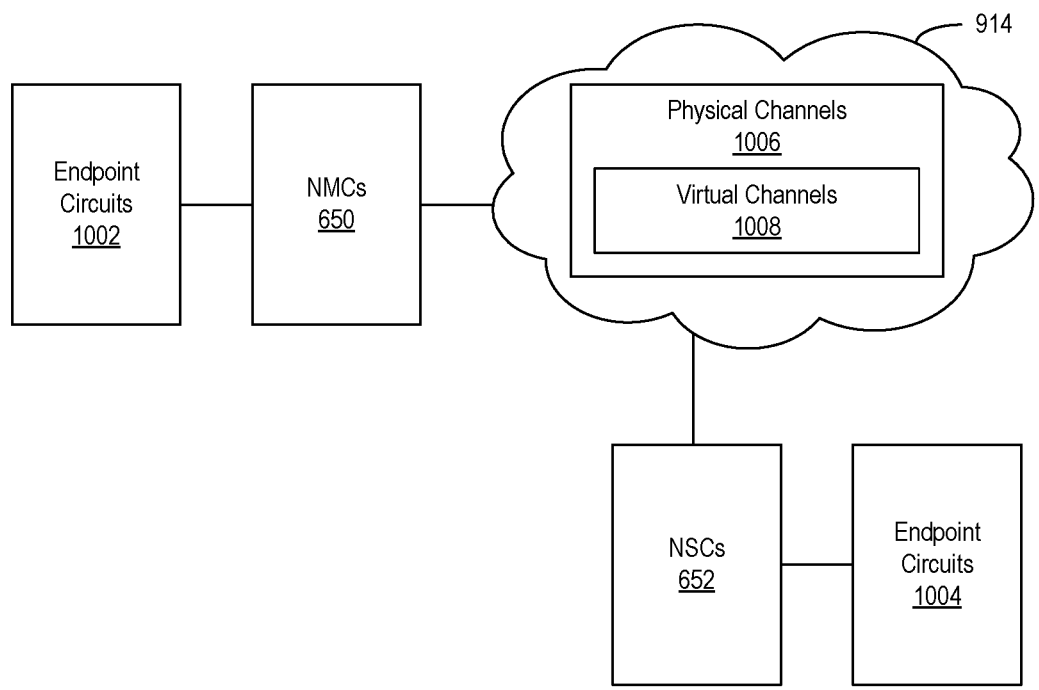
FIG. 10 is a block diagram depicting connections between endpoint circuits of an electronic system as implemented through a NoC.

FIG. 10 is a block diagram depicting connections between endpoint circuits in an IC through NoC 106 according to an example. In the example, endpoint circuits 1002 are connected to endpoint circuits 1004 through NoC 106. Endpoint circuits 1002 are master circuits, which are coupled to NMCs 650 of NoC 106. Endpoint circuits 1004 are slave circuits coupled to NSCs 652 of NoC 106. Each endpoint circuit 1002 and 1004 can be any of a variety of circuits such as, for example, interface tiles 304 and/or any of the various subsystems 108-116. Examples of different subsystems may include, but are not limited to, a processor system, programmable logic, hardwired circuit blocks (e.g., digital-to-analog converters, analog-to-digital converters, transceivers, etc.). For example, one or more of the endpoint circuits 1002 and/or 1004 may be processor 206 and/or memory 204.

Network 914 includes a plurality of physical channels 1006. Physical channels 1006 are implemented by programming NoC 106. Each physical channel 1006 includes one or more NoC packet switches 906 and associated routing 908. An NMC 650 connects with an NSC 652 through at least one physical channel 1006. A physical channel 1006 can also have one or more virtual channels 1008.

Connections through network 914 use a master-slave arrangement. In an example, the most basic connection over network 914 includes a single master connected to a single slave. However, in other examples, more complex structures can be implemented.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "output" means storing in physical memory elements, e.g., devices, writing to display or other peripheral output device, sending or transmitting to another system, exporting, or the like.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The flowchart and block diagrams in the Figures illustrate the architecture, functionality, and operation of possible implementations of systems and methods according to various aspects of the inventive arrangements. In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The entire claim set will be inserted here pending final approval of the claims.

The foregoing and other implementations can each optionally include one or more of the following features, alone or in combination. Some example implementations include all the following features in combination.

What is claimed is:

1. An integrated circuit, comprising:
   a data processing array including a plurality of compute tiles arranged in a grid;
   an array interface coupled to the data processing array, wherein the array interface includes a plurality of interface tiles, wherein each interface tile includes a stream switch and a plurality of direct memory access circuits; and
   a network-on-chip (NoC) coupled to the array interface, wherein the NoC includes a plurality of interface circuits;
   wherein the plurality of interface tiles include selector switches that are programmable to connect different ones of the plurality of direct memory access circuits to different ones of the plurality of interface circuits of the NoC;
   wherein one or more of the plurality of interface tiles include a first selector switch coupled to a first direct memory access circuit of a same interface tile and a second selector switch coupled to a second direct memory access circuit of the same interface tile; and wherein the first selector switch is programmable to connect the first direct memory access circuit to a first interface circuit of the NoC or a second interface circuit of the NoC and the second selector switch is programmable to connect the second direct memory access circuit to a third interface circuit of the NoC or connect a direct memory access circuit of an adjacent interface tile to the third interface circuit of the NoC.

2. The integrated circuit of claim 1, wherein the plurality of direct memory access circuits of each of the plurality of interface tiles are configured to concurrently convey a plurality of data streams to the data processing array.

3. The integrated circuit of claim 1, wherein each direct memory access circuit is communicatively linked to the NoC via an independent communication channel.

4. The integrated circuit of claim 1, wherein
each stream switch is connected to at least one other stream switch disposed in a west adjacent interface tile or an east adjacent interface tile; and
each stream switch is connected to another stream switch in a north adjacent array tile.

5. The integrated circuit of claim 1, wherein
the plurality of direct memory access circuits are configured to convert data streams received from the stream switch into memory-mapped transactions that are conveyed to the NoC; and
the plurality of direct memory access circuits are configured to convert memory-mapped transactions received from the NoC into data streams conveyed to the stream switch.

6. The integrated circuit of claim 5, wherein
each interface tile includes a stream multiplexer-demultiplexer coupled to each direct memory access circuit of the interface tile; and
each stream multiplexer-demultiplexer is configured to selectively pass data streams received from the plurality of direct memory access circuits to the stream switch and direct streams received from the stream switch to selected ones of the plurality of direct memory access circuits.

7. The integrated circuit of claim 6, wherein
each interface tile includes a plurality of NoC stream interfaces corresponding to the plurality of direct memory access circuits; and
each NoC stream interface is configured to receive data streams from the NoC and convey the data streams to the stream multiplexer-demultiplexer, and receive data streams from the stream switch and convey the data streams to the NoC via one or more of the selector switches.

8. The integrated circuit of claim 1, wherein
the grid of the plurality of compute tiles includes a plurality of columns each including one or more of the plurality of compute tiles; and
each column of the grid includes a selected compute tile of the one or more of the plurality of compute tiles having a stream switch that is connected to the stream switch of an interface tile aligned with the column.

9. The integrated circuit of claim 1, wherein
the grid of the plurality of compute tiles includes a plurality of memory tiles distinct from the compute tiles;

the grid includes a plurality of columns each including one or more of the plurality of compute tiles and one or more of the plurality of memory tiles; and
each column of the grid includes a selected memory tile of the one or more of the plurality of memory tiles having a stream switch that is connected to the stream switch of an interface tile aligned with the column.

10. The integrated circuit of claim 1, wherein the plurality of interface circuits include NoC master circuits; and
wherein each direct memory access circuit is coupled to a NoC master circuit of the NoC via at least one of the selector switches and is configured to convey transactions through the NoC via the NoC master circuit.

11. The integrated circuit of claim 1, wherein the first selector switch is programmable to connect the first direct memory access circuit to the second interface circuit of the NoC via another selector switch of an adjacent interface tile of the plurality of interface tiles.

12. An array interface for an integrated circuit, the array interface comprising:
a plurality of interface tiles, wherein each interface tile includes:
a stream switch coupled to another stream switch of an adjacent compute tile of a data processing array or an adjacent memory tile of the data processing array, wherein the stream switch is also coupled to the stream switch of at least one adjacent interface tile of the array interface;
a stream multiplexer-demultiplexer coupled to the stream switch; and
a plurality of direct memory access circuits, wherein each direct memory access circuit is coupled to the stream multiplexer-demultiplexer and to a network-on-chip (NoC);
wherein the direct memory access circuits are configured to convert data streams received from the stream multiplexer-demultiplexer into memory-mapped transactions that are conveyed to the NoC and convert memory-mapped transactions received from the NoC into data streams conveyed to the stream multiplexer-demultiplexer;
one or more selector switches that are programmable to connect different ones of the plurality of direct memory access circuits to different ones of a plurality of NoC master circuits of the NoC;
wherein one or more of the plurality of interface tiles includes a first selector switch coupled to a first direct memory access circuit of a same interface tile and a second selector switch coupled to a second direct memory access circuit of the same interface tile; and
wherein the first selector switch is programmable to connect the first direct memory access circuit to a first NoC master circuit of the NoC or a second NoC master circuit of the NoC and the second selector switch is programmable to connect the second direct memory access circuit to a third NoC master circuit of the NoC or connect a direct memory access circuit of an adjacent interface tile to the third NoC master circuit of the NoC.

13. The array interface of claim 12, wherein
each direct memory access circuit is communicatively linked to the NoC via an independent communication channel; and
each interface tile of the plurality of interface tiles provides a plurality of independent connections to the NoC.

14. The array interface of claim 12, wherein
each stream multiplexer-demultiplexer is configured to selectively pass data streams received from the plurality of direct memory access circuits to the stream switch and data direct streams received from the stream switch to selected ones of the plurality of direct memory access circuits.

15. The array interface of claim 12, wherein each interface tile includes:
a plurality of NoC stream interfaces corresponding to the plurality of direct memory access circuits; and
each NoC stream interface is configured to receive data streams from the NoC and convey the data streams to the stream multiplexer-demultiplexer and receive data streams from the stream multiplexer-demultiplexer and convey the data streams to the NoC.

16. The array interface of claim 12, wherein the plurality of direct memory access circuits are selectively coupled to different ones of the plurality of NoC master circuits of the NoC via the one or more selector switches and are configured to convey transactions through the NoC via particular NoC master circuits based on programming of the one or more selector switches.

17. The array interface of claim 12, wherein the first selector switch is programmable to connect the first direct memory access circuit to the second NoC master circuit of the NoC via another selector switch of an adjacent interface tile of the plurality of interface tiles.

18. The array interface of claim 12, wherein the plurality of direct memory access circuits are configured to concurrently convey a plurality of data streams to the data processing array via a plurality of NoC stream interfaces.

19. An integrated circuit, comprising:
a data processing array including a plurality of compute tiles arranged in a grid;
an array interface coupled to the data processing array, wherein the array interface includes a plurality of interface tiles, wherein each interface tile includes a stream switch and a plurality of direct memory access circuits; and
a network-on-chip (NoC) coupled to the array interface, wherein the NoC includes a plurality of interface circuits;
wherein one or more of the plurality of interface tiles include a first selector switch coupled to a first direct memory access circuit of a same interface tile and a second selector switch coupled to a second direct memory access circuit of the same interface tile; and
wherein the first selector switch is programmable to connect the first direct memory access circuit to a first interface circuit of the NoC or a second interface circuit of the NoC and the second selector switch is programmable to connect the second direct memory access circuit to a third interface circuit of the NoC or connect a direct memory access circuit of an adjacent interface tile to the third interface circuit of the NoC.

20. The integrated circuit of claim 19, wherein the first selector switch is programmable to connect the first direct memory access circuit to the second interface circuit of the NoC via another selector switch of an adjacent interface tile of the plurality of interface tiles.

* * * * *